US008775976B2

(12) United States Patent
Moon (10) Patent No.: US 8,775,976 B2
(45) Date of Patent: Jul. 8, 2014

(54) METHOD FOR SETTING BACKGROUND SCREEN AND MOBILE TERMINAL USING THE SAME

(75) Inventor: Sung Whan Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 539 days.

(21) Appl. No.: 12/942,380

(22) Filed: Nov. 9, 2010

(65) Prior Publication Data

US 2011/0119625 A1  May 19, 2011

(30) Foreign Application Priority Data

Nov. 13, 2009 (KR) .................. 10-2009-0109626

(51) Int. Cl.
| G06F 3/00 | (2006.01) |
| G06F 3/048 | (2013.01) |
| G06F 17/00 | (2006.01) |
| G06F 7/00 | (2006.01) |
| G09G 5/00 | (2006.01) |

(52) U.S. Cl.
USPC ........... 715/866; 715/230; 715/730; 715/810; 707/754; 707/915; 345/629

(58) Field of Classification Search
USPC ........... 345/629; 396/310; 707/706, 738, 754, 707/915; 715/730, 866, 230, 810
See application file for complete search history.

(56) References Cited

U.S. PATENT DOCUMENTS

| 7,171,113 | B2* | 1/2007 | Parulski et al. ............... 396/287 |
| 7,979,801 | B2* | 7/2011 | Krishnaswamy et al. .... 715/730 |
| 8,199,979 | B2* | 6/2012 | Steinberg et al. ............. 382/118 |
| 2005/0209923 | A1* | 9/2005 | Jablonski et al. ............... 705/14 |
| 2006/0069998 | A1* | 3/2006 | Artman et al. ................ 715/721 |
| 2006/0271691 | A1* | 11/2006 | Jacobs et al. ................. 709/228 |
| 2007/0067295 | A1* | 3/2007 | Parulski et al. .................... 707/7 |
| 2007/0074110 | A1* | 3/2007 | Miksovsky et al. ........... 715/520 |
| 2007/0081813 | A1* | 4/2007 | Hong et al. .................... 396/310 |
| 2007/0132783 | A1* | 6/2007 | Lim et al. ....................... 345/629 |
| 2007/0186167 | A1* | 8/2007 | Anderson ...................... 715/730 |
| 2008/0132287 | A1* | 6/2008 | Choi .............................. 455/566 |
| 2008/0189270 | A1* | 8/2008 | Takimoto et al. ................. 707/5 |
| 2008/0306993 | A1* | 12/2008 | Young ......................... 707/103 R |
| 2009/0005071 | A1* | 1/2009 | Forstall et al. ............. 455/456.1 |
| 2009/0089711 | A1* | 4/2009 | Dunton et al. ................ 715/838 |
| 2009/0164946 | A1* | 6/2009 | Liddington ................... 715/853 |
| 2009/0172547 | A1* | 7/2009 | Sparr ............................. 715/730 |
| 2010/0080470 | A1* | 4/2010 | Deluca et al. ................. 382/209 |
| 2010/0192219 | A1* | 7/2010 | Carvajal et al. ................. 726/19 |
| 2011/0016398 | A1* | 1/2011 | Hanes ............................ 715/730 |
| 2011/0035708 | A1* | 2/2011 | Damale ......................... 715/863 |
| 2011/0050564 | A1* | 3/2011 | Alberth et al. ................ 345/156 |

* cited by examiner

*Primary Examiner* — Nicholas Ulrich
(74) *Attorney, Agent, or Firm* — Jefferson IP Law, LLP (57) ABSTRACT

An apparatus and method of setting a background screen of a mobile terminal are provided. The method includes receiving a selection of background screen set menu, generating a tag information list by using at least one tag information which classifies a plurality of images stored in the mobile terminal by related image, displaying the generated tag information list, receiving a selection of at least one tag information from among the displayed tag information list, and configuring a background screen with at least one image classified as the at least one selected tag information.

18 Claims, 7 Drawing Sheets

METHOD FOR SETTING BACKGROUND SCREEN AND MOBILE TERMINAL USING THE SAME

PRIORITY

This application claims the benefit under 35 U.S.C. §119(a) of a Korean patent application filed on Nov. 13, 2009 in the Korean Intellectual Property Office and assigned Ser. No. 10-2009-0109626, the entire disclosure of which is hereby incorporated by reference.

BACKGROUND OF THE INVENTION

1. Field of the Invention

The present invention relates to a method of setting a background screen and a mobile terminal using the same. More particularly, the present invention relates to a method of setting an image to be displayed on a background screen of a mobile terminal and a mobile terminal using the same.

2. Description of the Related Art

Recently, mobile terminals have been more heavily relied upon by people, as evidenced by the rapid increment of the diffusion rate of the mobile terminal. The mobile terminal can now provide various data transmission services and various additional services, as well as characteristic voice call service, such that it can be used as a multimedia communications device based on its function. The mobile terminal generally includes a function of setting the background screen. Conventionally, a user can set the background screen by selecting one or a plurality of images stored in the mobile terminal. Occasionally, the user may wish to set the background screen with a set of related images when setting the background screen with a plurality of images. For instance, the user may wish to set the background screen using only pictures the user photographed while on a vacation. However, presently, with the conventional method for setting a background screen implemented in the mobile terminal, the user must configure the background screen by selecting desired images one by one, after checking the list of stored images. When relations do not exist between images, the user must select images for the background screen one by one. However, it can still be a troublesome task for the user to select images one by one, even when relations exist between images.

SUMMARY OF THE INVENTION

An aspect of the present invention is to address at least the above-mentioned problems and/or disadvantages and to provide at least the advantages described below. Accordingly, an aspect of the present invention is to provide a method of easily and conveniently setting a background screen of a mobile terminal by a user. The present invention further provides a mobile terminal using the above described method.

In accordance with an aspect of the present invention, a method of setting a background screen of a mobile terminal is provided. The method includes receiving a selection of a background screen set menu, generating a tag information list by using at least one tag information which classifies one or more images stored in the mobile terminal as related images, displaying the generated tag information list, receiving a selection of at least one tag information among the displayed tag information list, and configuring a background screen including at least one image classified as the at least one selected tag information.

In accordance with another aspect of the present invention, a mobile terminal is provided. The terminal includes a storage unit that stores a plurality of images and at least one tag information which classifies the plurality of images by related images, a display unit that displays a tag information list configured of the at least one tag information, an input unit which receives a command of a user, and a controller which controls the input unit to receive a selection of background screen set menu, generates a tag information list by using the tag information stored in the storage, controls the display unit to display the generated tag information list, controls the input unit to receive a selection of at least one tag information among the displayed tag information list, and configures a background screen including at least one image classified as the at least one selected tag information.

According to the present invention, a user can easily and conveniently set the background screen of a mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present invention, 'theme tag information' refers to a kind of tag information associated with an image, corresponding to tag information which is used to classify a plurality of images stored in a mobile terminal by related image. The theme tag information can be set in a header of an image file, and can be managed by a separate database. For instance, when an image corresponds to a Joint Photographic coding Experts Group (JPEG) file, the theme tag information can be stored in an application header included within the JPEG file. The theme tag information corresponds to at least one of user tag information generated by an input of a user, time tag information on image generation time, and location tag information on image generation location. The user tag information can be set by a mobile terminal or by an external device (e.g., a Personal Computer (PC)).

In the following description, the mobile terminal is illustrated as an exemplary device, but the invention is not limited to this. The mobile terminal according to an exemplary embodiment of the present invention may include, preferably, all information telecommunications terminals and multimedia devices such as a mobile communications terminal, Portable Multimedia Player (PMP), a Personal Digital Assistant (PDA), a smart phone, and a MP3 player.

Figure 1:
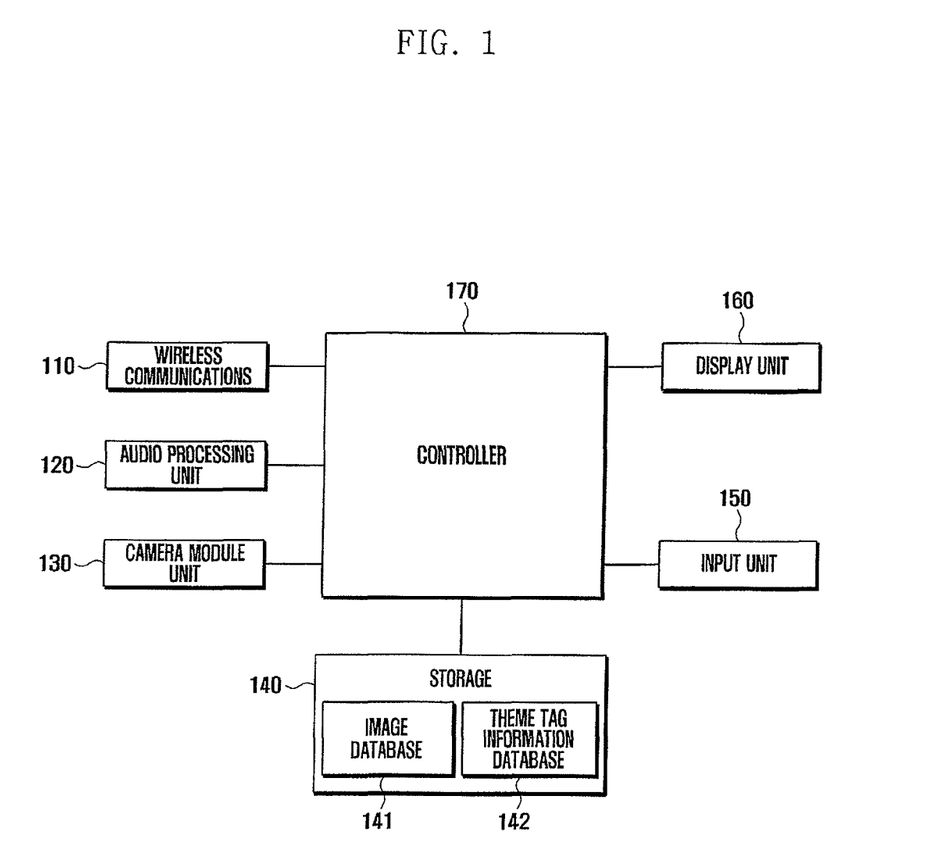
FIG. 1 is a block diagram illustrating a configuration of a mobile terminal for implementing a method of setting a background screen according to an exemplary embodiment of the present invention.

FIG. 1 is a block diagram illustrating a configuration of a mobile terminal for implementing a method of setting a background screen according to an exemplary embodiment of the present invention.

A wireless communications unit 110 performs the transmission-reception function of corresponding data for wireless communications of the mobile terminal. The wireless communications unit 110 includes a Radio Frequency (RF) transmitter which up-converts and amplifies the frequency of the transmitted signal and an RF receiver which low-noise amplifies the received signal and down-converts the frequency. Moreover, the wireless communications unit 110 may receive data through a wireless channel and outputs it to a controller 170, and can transmit data outputted from the controller 170 through the radio channel.

A conventional mobile terminal, such as a smart phone, PMP, PDA, MP3 player, etc., typically includes an audio processing unit 120. An audio processing unit 120 can be configured of a codec, including a data codec which processes packet data and an audio codec which processes an audio signal such as a voice. The audio processing unit 120 converts a digital audio signal into an analog audio signal through the audio codec to play through a speaker (not shown), and converts an analog audio signal inputted from a microphone (not shown) into a digital audio signal through the audio codec. According to an exemplary embodiment of the invention, the audio processing unit 120 can be omitted from the elements of the mobile terminal.

A camera module unit 130 takes a picture of a subject and generates an image to transmit to the controller 170. The camera module unit 130 includes a camera sensor which converts an optical signal into an electric signal and a signal processing unit which converts an analog image signal into a digital data. Here, the camera sensor can be a Charge Coupled Device (CCD) sensor or a Complementary Metal Oxide Semiconductor (CMOS) sensor. The signal processing unit can be a Digital Signal Processor (DSP).

Moreover, the camera sensor and the signal processing unit can be implemented with an integrated type, and can be implemented with a separate type. According to an exemplary embodiment of the present invention, the camera module unit 130 can be omitted from among elements of the mobile terminal. In this case, the method of setting a background screen of the present invention is applied to images previously stored in the mobile terminal or to images received from outside.

A storage 140 stores a program and data necessary for the operation of the mobile terminal, and can be classified into a program area and a data area. The storage 140 according to an exemplary embodiment of the present invention can be configured of a volatile storage medium or of a nonvolatile storage medium, and can be configured of the combination of both storage media. The volatile storage medium includes a semiconductor memory such as Random Access Memory (RAM), Dynamic Random Access Memory (DRAM), and Static Random Access Memory (SRAM). The non-volatile storage medium includes a hard disk. The storage 140 according to the embodiment of the present invention includes an image database 141 and a theme tag information database 142.

The image database 141 is a storing unit which stores an image. The image can be an image generated by the camera module unit 130, an image previously stored in the mobile terminal, and an image received from outside. The image can include images of a JPEG file format, a Graphics Interchange Format (GIF) file format, a Bit Map (BMP) file format, and a Tagged Image File Format (TIFF) file format.

The theme tag information database 142 is a storing unit which stores theme tag information set in images stored in the image database 141. The theme tag information database 142 matches information distinguishing images stored in the image database 141 with the theme tag information and stores it. The information distinguishing image can be a file name which is set when image is stored. The theme tag information is a kind of image tag information, being reference information which is used to classify images stored in the image database 141 by related image. The theme tag information can be classified into user tag information generated by an input of the user, time tag information about an image's generation time, and location tag information about an image's generation location.

According to an exemplary embodiment of the present invention, when images stored in the image database 141 include the theme tag information, the theme tag information database 142 can be omitted. In this case, both the actual data of the image and the theme tag information are managed in the image database 141. The storage 140 can store map data, and the map data provides data which is necessary for generating the location tag information among the theme tag information.

An input unit 150 receives a key operation signal of the user for controlling the mobile terminal and sends it to the controller 170. The input unit 150 can exemplarily be configured of a keypad such as 3*4 keyboard, a Qwerty keyboard including a numeric keypad, a character key, and a direction key, and can alternatively be configured of a touch pad in the case of a touch screen-based mobile terminal. Moreover, in the case of the mobile terminal including an image sensor or an acceleration sensor, the sensor also can be the input unit 150.

In the method of setting a background screen according to an embodiment of the present invention, a user can input a command of selecting a background screen set menu, and a command of selecting one or a plurality of theme tag information from among theme tag information list, through the input unit 150. Moreover, when a new image is generated from the camera module unit 130, or a new image is received by the mobile terminal through a module unit (not shown) (e.g., a blue-tooth module unit or a wire communications connection terminal) for the wire/wireless communications with the wireless communications unit 110 or an external device, the user can input a command of storing the new image through the input unit 150.

A display unit 160 can be formed of a Liquid Crystal Display (LCD), and visually provides the user with the menu, the inputted data, the function setting information, and other various information of the mobile terminal. For example, the display unit 160 outputs the booting screen, the stand-by screen, the call screen, and other application execution screens of the mobile terminal. The display unit 160 displays the background screen configured by the user. The background screen is formed of one or more images stored in the image database 141. The display unit 160 displays the background screen as a static type or a dynamic type. For instance, the display unit 160 can display a plurality of images with a preset cycle in the type of a slide show, or can display a plurality of images after arranging the images in the type of a tile or a mosaic. The display unit 160 displays a menu screen of setting a background screen. In an exemplary implementation, the menu screen of setting a background screen is configured to include the theme tag information list comprising of theme tag information. The menu screen of setting a background screen can further include an input window selecting the theme tag information.

The controller 170 controls the overall operation of each element of the mobile terminal. The controller 170 extracts the theme tag information which is set in the image. The controller 170 controls the camera module unit 130 to generate a new image, or controls a module unit for the wire/wireless communications with the wireless communications unit 110 or the external device to receive a new image. When the controller 170 recognizes a command of storing a new image through the input unit 150, it extracts theme tag information from the new image.

The controller 170 stores the new image in the image database 141, and stores the extracted theme tag information in the theme tag information database 142. When the theme tag information is not set in the new image, the controller 170 does not extract the theme tag information, but stores the new image in the image database 141.

When the controller 170 recognizes a command of the user that selects a menu of setting a background screen through the input unit 150, it generates a theme tag information list by using the theme tag information stored in the theme tag information database 142, and displays the generated theme tag information list by controlling the display unit 160. When the controller 170 recognizes a command of selecting one or more theme tags among the theme tag information list displayed on the display unit 160 through the input unit 150, it extracts one or more images corresponding to the selected theme tag information from the image database 141, and configures the background screen by using the extracted one or more images.

According to an exemplary embodiment of the present invention, when the controller 170 recognizes a command of selecting a plurality of theme tag information from among the theme tag information list displayed on the display unit 160 through the input unit 150, the controller 170 can extract all images satisfying any one of the selected theme tag information from the image database 141, or can extract those images satisfying all selected theme tag information from the image database 141. Moreover, the controller 170 can control the display unit 160 to display a menu screen of setting the order of displaying the extracted image on the background screen or setting the type of displaying. In the case of receiving the information of setting the order of displaying on the background screen or setting the type of displaying through the input unit 150, the controller 170 configures the background screen according to the inputted set information. The controller 170 displays the configured background screen by controlling the display unit 160.

According to an exemplary embodiment of the present invention, in case the mobile terminal does not include the theme tag information database 142 in the storage 140, when the controller 170 recognizes a command of a user selecting the background screen set menu through the input unit 150, it can extract the theme tag information from respective images stored in the image database 141.

When the background screen configured by using the theme tag information is displayed on the display unit 160, in case a command of storing a new image is recognized through the input unit 150, the controller 170 extracts the theme tag information from the new image. The controller 170 determines whether the extracted theme tag information is identical with the theme tag information which is used to configure the background screen which is displayed at present. If it is identical, the controller 170 includes the new image in reconfiguring the background screen. The controller 170 controls the display unit 160 to display the reconfigured background screen.

In addition to the above described elements, the mobile terminal can further include a Global Positioning System (GPS) module unit, a local area communications module unit, and a wire communication connection apparatus. The GPS module unit provides data necessary for generating the location tag information. The local area communications module unit is comprised of a blue-tooth module unit and an Infrared module unit, and receives an image from the external device. The wire communication connection apparatus also receives an image from the external device.

So far, the mobile terminal for implementing the method of setting a background screen of the present invention has been illustrated. Below, a detailed process of the method of setting a background screen of the present invention will be illustrated.

Figure 2:
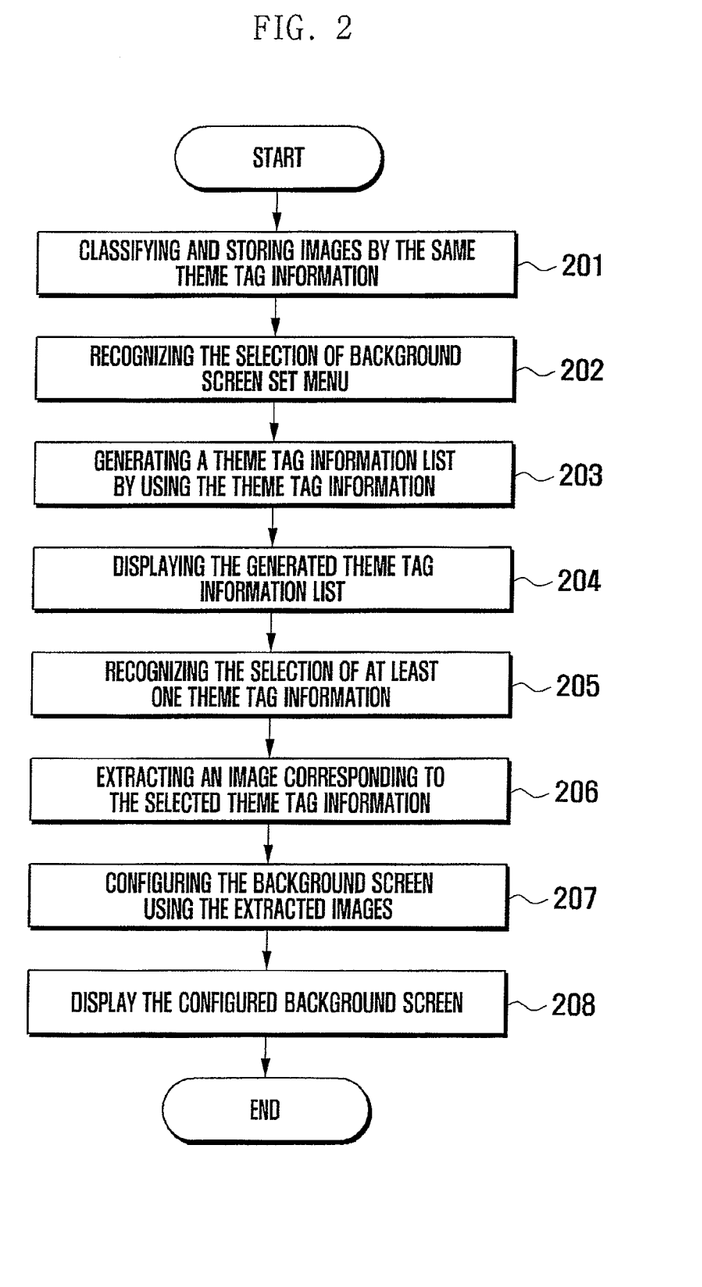
FIG. 2 is a flowchart illustrating a method of setting a background screen by primarily using theme tag information according to an exemplary embodiment of the present invention.

FIG. 2 is a flowchart illustrating a method of setting a background screen by primarily using theme tag information according to an exemplary embodiment of the present invention.

The controller 170 classifies and stores images stored in the image database 141 by the same theme tag information at step 201. This process is previously performed before the user selects the background screen set menu. In more detail, when the controller 170 controls the camera module unit 130 to generate a new image, or controls the module unit for wire/wireless communications with the wireless communications unit 110 or the external device to receive a new image, and receives a command of storing the received image through the input unit 150 from the user, it extracts the theme tag information from the new image, stores the new image in the image database 141, and stores the extracted theme tag information in the theme tag information database 142.

When the extracted theme tag information is stored in the theme tag information database 142, the controller 170 classifies the image according to the same theme tag information, and matches the identifying information (e.g., image file name) of the image with the respective theme tag information to store it. The theme tag information of the present invention includes user tag information generated by the input of a user, time tag information about the image's generation time, and location tag information about the image's generation location. The user tag information is information which is directly set by the user, and is reference information which is used when the user classifies related images. For example, when the name of user's friend is Jane, and the user desires to store photographs of Jane in the mobile terminal, 'Jane' can be set in each photograph as the user tag information. The time tag information is the information indicating the time when the image is generated, and can be set with date and time.

The location tag information is information indicating the location where the image is generated. In a case of the image received from outside, the location tag information is previously generated and is received together with image data. The location tag information is generated from the Global Positioning System (GPS) and the map data in the case of the image being generated from the camera module unit 130. When the controller 170 operates the camera module unit 130 and takes a picture of a subject, it receives the latitude and longitude data of the mobile terminal by using the GPS module unit, generates the location information of the mobile terminal by mapping the latitude and longitude data with the map data stored in the storage 140, and stores this location information as the location tag information. When the map data is not stored in the storage 140, the controller 170 can receive map data corresponding to the latitude and longitude data of the mobile terminal from a map server through the wireless communications unit 110.

When the image is configured of a file format (e.g., JPEG file format) which can include the theme tag information, the controller 170 extracts the theme tag information from the image and stores in the theme tag information database 142. Alternatively, the controller can directly set the theme tag information and store it in the theme tag information database 142 to manage when the image is configured of a file format which cannot include the theme tag information.

In the present example, it is assumed that the image database 141 stores 'Image 1', 'Image 2', 'Image 3', 'Image 4', 'Image 5', and 'Image 6'. To further illustrate this example, assume that 'Image 1' includes 'Jane', 'Europe tour' (user tag information) and '2008 Nov. 1' (time tag information); 'Image 2' includes 'Jane', 'Europe tour' (user tag information), '2008 Nov. 1' (time tag information), and 'U.S. (Los Angeles)' (location tag information); 'Image 3' includes 'Michael' (user tag information), '2007 Jan. 1' (time tag information), and 'Republic of Korea (Seoul)' (location tag information); 'Image 4' includes 'Jane' (user tag information) and '2009 Jul. 10' (time tag information); 'Image 5' includes 'Jane' (user tag information), '2009 Jul. 10' (time tag information), and 'Japan (Tokyo)' (location tag information); and 'image 6' includes 'Michael' (user tag information) and '2009 Jul. 10' (time tag information).

Here, 'Image 1' to 'Image 6' are image file names and it is assumed that '0001' to '0006' are stored as the respective file names. At this time, the theme tag information database 142 stores '0001', '0002', '0004', and '0005' corresponding to 'Jane', '0004', '0005', and '0006' corresponding to '2009 Jul. 10', '0001' and '0002' corresponding to 'Europe tour', '0003' and '0006' corresponding to 'Michael', '0001' and '0002' corresponding to '2008 Nov. 11', '0003' corresponding to 'Republic of Korea (Seoul)', '0005' corresponding to 'Japan (Tokyo)', '0002' corresponding to 'U.S. (Los Angeles)', and '0006' corresponding to '2007 Jan. 1'.

The controller 170 recognizes the command of selecting the background screen set menu by the user through the input unit 150 at step 202. When the user selects the background screen set menu through the input unit 150, the input unit 150 generates an input signal and transmits it to the controller 170. The controller 170 receives the input signal and recognizes that the user selected the background screen set menu. According to an exemplary embodiment of the present invention, the background screen set menu can be classified into two modes, including a 'normal setup mode' and a 'theme set mode'. The 'normal setup mode' refers to a mode in which a user selects images for the background screen one by one. The 'theme set mode' refers to a mode in which the user selects images for the background screen by using theme tag information.

In an exemplary embodiment in which the background screen set menu is classified into two setup modes, when the controller 170 receives the input signal from the input unit 150 and recognizes that the user selected the background screen set menu, the controller controls the display unit 160 to display a menu screen selecting one from between 'normal set mode' and 'theme set mode' and controls the input unit 150 to recognize the background screen set mode which the user selects. For this example, it is assumed that the user selects 'theme set mode'.

The controller 170 generates a theme tag information list by using the theme tag information stored in the theme tag information database 142 at step 203. According to an exemplary embodiment of the present invention, in the theme tag information database 142, image identification information is classified by the same theme tag information. The controller 170 extracts all theme tag information stored in the theme tag information database 142 and generates a theme information list by using the extracted theme tag information. According to an exemplary embodiment of the present invention, the controller 170 can generate the theme tag information list classified by the user tag information, the time tag information, and the location tag information.

According to an exemplary embodiment of the present invention, when the controller 170 recognizes that the user selected the background screen set menu through the input unit 150, the controller 170 extracts the theme tag information from images stored in the image database 141 and can generate the theme tag information list by using the extracted theme tag information. This can also be applied to a mobile terminal which is configured to not include the theme tag information database 142 in the storage 140. The controller 170 does not previously extract the theme tag information from image, but performs the process of extracting the theme tag information when the user selects the background screen set menu. According to this exemplary embodiment, the controller 170 can generate the theme tag information list after extracting the theme tag information and classifying images according to the same theme tag information. The controller 170 controls the display unit 160 and displays the generated theme tag information list at step 204.

Figure 4:
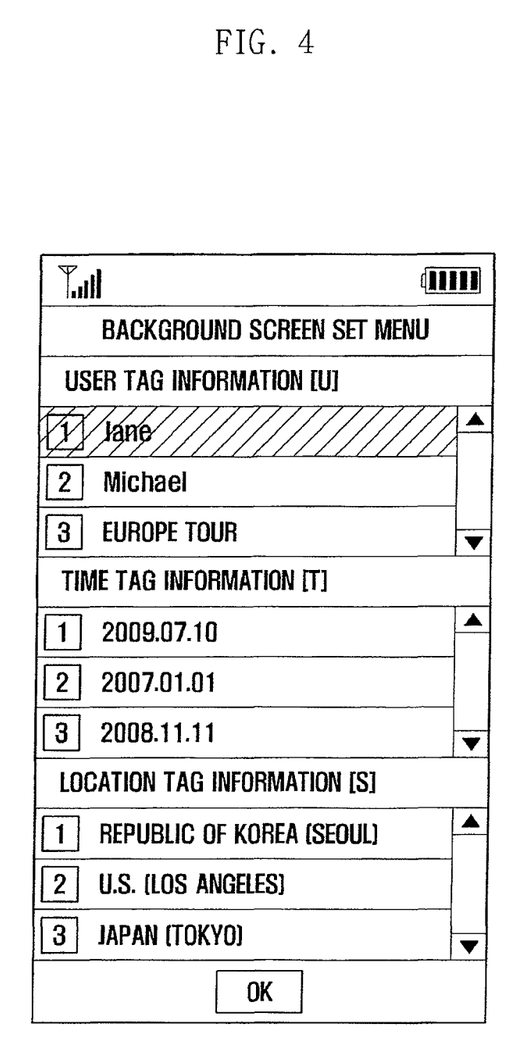
FIG. 4 is a diagram illustrating a menu screen for setting a background screen including a theme tag information list according to an exemplary embodiment of the present invention.

FIG. 4 is a diagram illustrating a menu screen for setting a background screen including a theme tag information list according to an exemplary embodiment of the present invention.

Referring to FIG. 4, the theme tag information list is classified into user tag information, time tag information, and location tag information. 'Jane', 'Michael', and 'the Europe tour' are illustrated as the user tag information. '2009Jul. 10', '2007Jan. 1', and '2008 Nov. 11' are illustrated as the time tag information. 'Republic of Korea (Seoul)', 'U.S. (Los Angeles)', and 'Japan (Tokyo)' are illustrated as the location tag information. All of these correspond to the theme tag information extracted from 'Image 1' to 'Image 6' stored in the image database 141. More particularly, FIG. 4 depicts a menu screen selecting one theme tag information from among those in theme tag information list.

Figure 5:
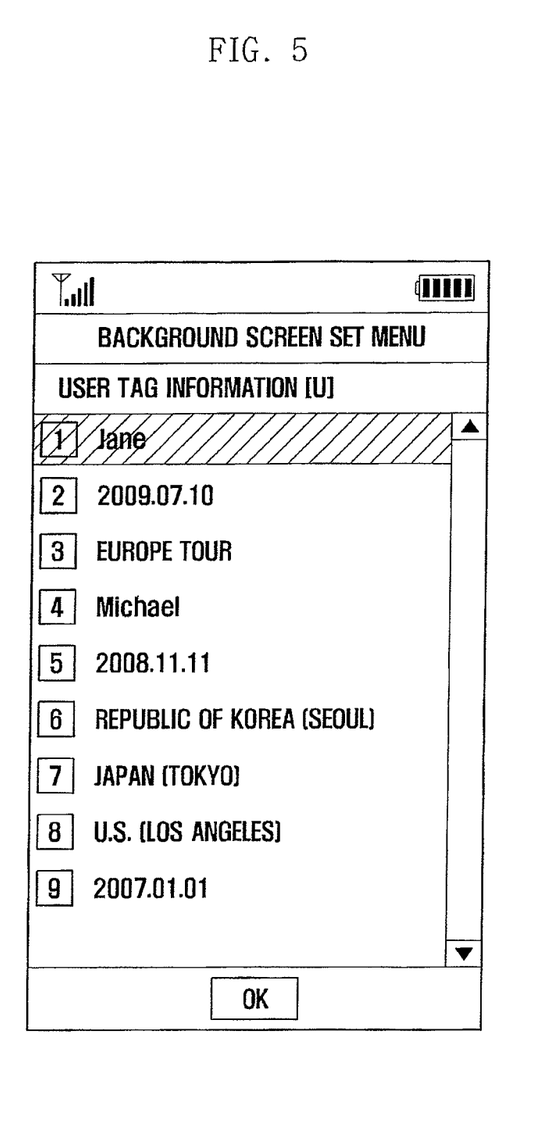
FIG. 5 is a diagram illustrating a menu screen for setting a background screen including a theme tag information list according to an exemplary embodiment of the present invention.

FIG. 5 is a diagram illustrating a menu screen for setting a background screen including a theme tag information list according to an exemplary embodiment of the present invention.

Referring to FIG. 5, the theme tag information list is not classified into user tag information, time tag information, and location tag information. According to this exemplary embodiment, the controller 170 ranks theme tag information according to the number of images corresponding to respective theme tag information and thereby generates a theme tag information list. Of course, the invention is not limited to such a ranking, and other orders are possible. In the exemplary theme tag information list shown in FIG. 5, the theme tag information is enumerated according to the number of images corresponding to respective theme tag information. That is, 'Jane', which is set in four images, is shown as a first rank, and '2009Jul. 10', which is set in the three images, is shown as a second rank. Lower theme tag information is also enumerated in the example according to the rank of the number of images. FIG. 5 also depicts a menu screen by which the user can select one theme tag information from among the theme tag information list, as in FIG. 4.

Figure 6:
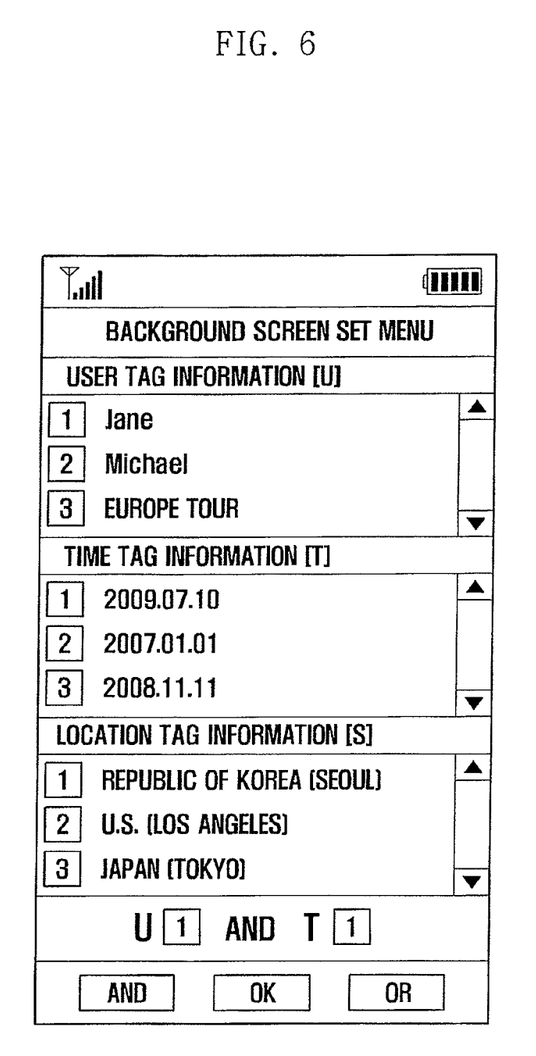
FIG. 6 is a diagram illustrating a menu screen for setting a background screen including a theme tag information list according to an exemplary embodiment of the present invention.

FIG. 6 is a diagram illustrating a menu screen for setting a background screen including a theme tag information list according to an exemplary embodiment of the present invention.

Referring to FIG. 6, the exemplary theme tag information list is classified into user tag information, time tag information, and location tag information. FIG. 6 depicts a menu screen by which the user can select a plurality of theme tag information from among the theme tag information list, but differently from FIG. 4 and FIG. 5. The controller 170 controls the input unit 150 to recognize the selection input of at least one theme tag information from among the theme tag information list displayed on the display unit 160 at step 205. When the user selects at least one theme tag information through the input unit 150, the input unit 150 generates an input signal and transmits it to the controller 170. The controller 170 receives the input signal and recognizes that the user selected at least one theme tag information. According to this exemplary embodiment, the user can either select only one theme tag information, or alternatively can select a plurality of theme tag information. In the menu screen of setting the background image of the exemplary embodiments depicted in FIG. 4 and FIG. 5, the user can select only one theme tag information. FIG. 4 and FIG. 5 show that the user selects 'Jane'. On the other hand, FIG. 6 shows that the user selects a plurality of theme tag information.

According to this exemplary embodiment, the user can select a plurality of theme tag information by using 'AND' or 'OR' operations. When the user desires to configure a background screen with an image which satisfies all of a plurality of selected theme tag information, the plurality of theme tag information is selected by using 'AND'. When the user desires to configure a background screen with images which satisfy any one of the plurality of theme tag information, the plurality of theme tag information can be selected by using 'OR'. In FIG. 6, the 'AND' key and the 'OR' key are shown. The user selects one theme tag information, inputs the 'AND' or 'OR' key, and selects again a theme tag information, thereby being able to select a plurality of theme tag information. FIG. 6 exemplarily shows that the user selects the first item ('Jane') in the user tag information, inputs the 'AND' key, and selects the first item ('2009 Jul. 10') in the time tag information. The controller 170 extracts an image corresponding to the selected theme tag information from the image database 141 at step 206. That is, the controller 170 checks for images corresponding to the selected theme tag information and extracts the actual data of the image from the image database 141. Referring to FIG. 4 and FIG. 5, after checking '0001', '0002', '0004', and '0005', which are image identification information corresponding to 'Jane', the controller 170 extracts corresponding images 'Image 1', Image 2', 'Image 4', and 'Image 5' from the image database 141.

Referring again to FIG. 6, after checking '0004' and '0005', which are image identification information satisfying both of 'Jane' and '2009 Jul. 10', the controller 170 extracts the corresponding images 'Image 4' and 'Image 5' from the image database 141. When the controller 170 controls the input unit 150 to recognize the selection input of 'Jane', 'OR', and 'Michael' at step 205, it extracts all of 'Image 1', Image 2', 'Image 4', and 'Image 5', corresponding to 'Jane', and 'Image 3' and 'Image 6', corresponding to 'Michael', at step 206. The controller 170 configures the background screen by using the extracted images at step 207 and controls the display unit 160 to display the configured background screen at step 208. According to this exemplary embodiment of the present invention, after extracting the images from the image database 141, the controller 170 can control the display unit 160 to display the menu screen of setting the display sequence of the images.

For example, the menu screen of setting the display sequence of the images can be configured of a thumbnail image of the extracted images and an input window for setting the display sequence. The user can set the sequence of displaying images on the background screen through the menu screen which sets the display sequence. The controller 170 configures the background screen by reflecting the set display sequence at step 207 and controls the display unit 160 to display the configured background screen at step 208.

According to this exemplary embodiment, after extracting the images from the image database 141, the controller 170 controls the display unit 160 to display the menu screen setting the type of displaying images. The type of displaying images can be a dynamic type or a static type. For example, the dynamic type can be a slide show type, and the static type can be a tile type or a mosaic type. The menu screen of setting the display type of images can be a menu screen of selecting from among the slide show, the tile or the mosaic.

In the present invention, as to the type of displaying an image, the slide show, the tile, and the mosaic type were illustrated. However, it is not limited to those types. The controller 170 configures the background screen by reflecting the set display type at step 207 and controls the display unit 160 to display the configured background screen at step 208. In the example depicted in FIGS. 4 and 5, the controller 170 configures the background screen with 'Image 1', 'Image 2', 'Image 4', and 'Image 5', and controls the display unit 160 to display the 'Image 1', 'Image 2', 'Image 4', and 'Image 5', according to the set sequence and type. In the example depicted in FIG. 6, the controller 170 configures the background screen with 'Image 4' and 'Image 5' and controls the display unit 160 to display the 'Image 4' and 'Image 5' according to the set sequence and type.

When the image is a portrait, the user tag information can be automatically set through face recognition. In this case, a program for recognizing the face in the portrait is stored in the program area of the storage unit 140. The controller 170 executes the program and can recognize the face in the portrait. In more detail, after controlling the camera module unit 130 to take a picture of a subject, the controller 170 recognizes the face of the subject and determines whether an image of the same face is stored in the image database 141. When the image is stored in the image database 141, the controller 170 checks the user tag information set in the stored image and can set the same user tag information in the newly generated image.

Figure 3:
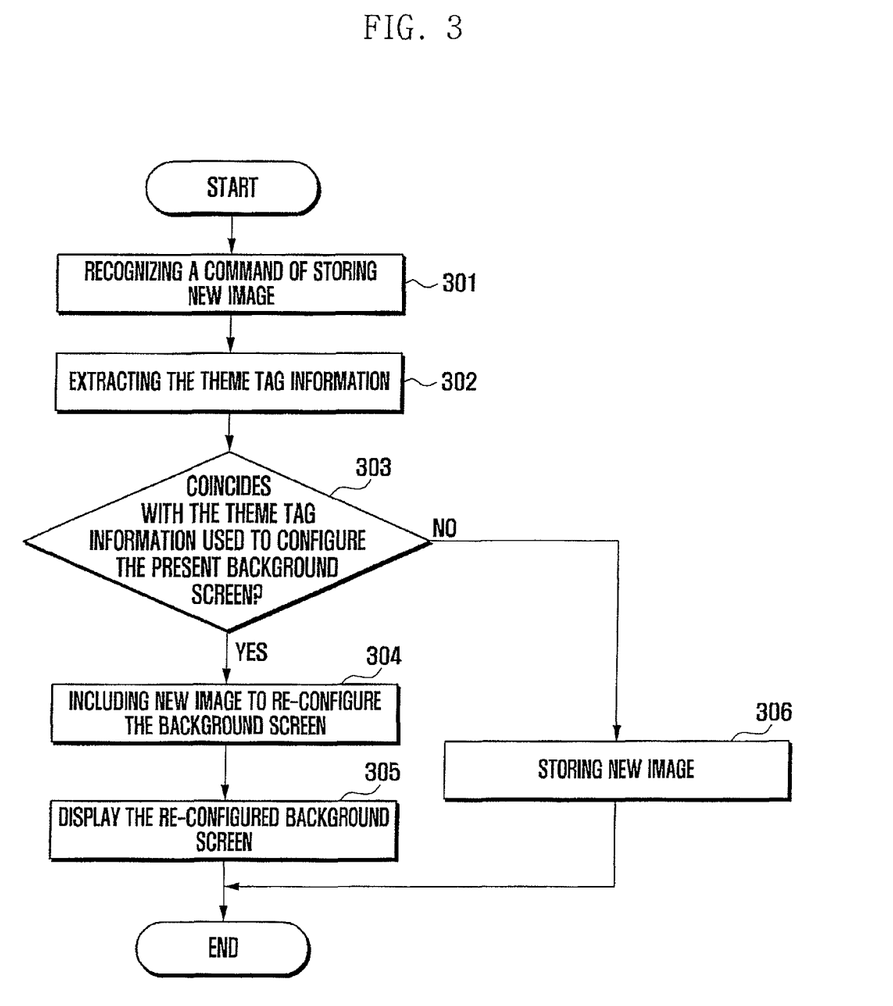
FIG. 3 is a flowchart illustrating a method of re-setting a background screen from a state where the background screen configured by using the present theme tag information is displayed according to an exemplary embodiment of the present invention.

FIG. 3 is a flowchart illustrating a method of re-setting a background screen in the state where the background screen which is configured by using the present theme tag information is displayed according to an exemplary embodiment of the present invention.

Referring to FIG. 3, the controller 170 generates or receives a new image while controlling the display unit 160 to display the background screen depending on the theme tag information. That is, the controller 170 controls the camera module unit 130 and takes a picture of the subject to generate an image, or controls the module unit for the wire/wireless communications with the wireless communications unit 110 or the external device to receive an image from outside. The controller 170 controls the input unit 150 and recognizes a command of storing the new image in the image database 141 at step 301. The controller 170 controls the display unit 160 and displays a message which selects whether to store the image. When the user selects to store the image through the input unit 150, the controller 170 recognizes the store command of the user through the input unit 150. The controller 170 extracts the theme tag information which is set in the new image at step 302. The theme tag information exemplarily includes the user tag information, the time tag information, and the location tag information. When any of the tag information is set in an image, the controller 170 extracts the set tag information. The controller 170 determines whether the extracted theme tag information coincides with the theme tag information which is used to configure the present background screen at step 303. For example, when the theme tag information which is used to configure the present background screen is 'Jane', the controller 170 determines whether the theme tag information extracted at step 302 corresponds to 'Jane'. When the extracted theme tag information coincides with the theme tag information as a result of the comparison of the theme tag information, the controller 170 includes the new image to re-configure the background screen at step 304 and controls the display unit 160 to display the re-configured background screen at step 305. That is, the controller 170 adds the new image to the list of the images configuring the present background screen. For instance, when the present background screen is configured of 'Image 1', 'Image 2', 'Image 4', and 'Image 5', while 'Image 7' is stored in the mobile terminal as a new image, the controller 170 can configure the background screen with 'Image 1', 'Image 2', 'Image 4', 'Image 5', and 'Image 7'. When the extracted theme tag information does not coincide with the theme tag information as a result of the comparison of the theme tag information, the controller 170 stores the new image in the image database 141 at step 306. The controller 170 stores the theme tag information, which is extracted while storing the image, in the theme tag information database 142.

According to exemplary embodiments of the present invention, the controller 170 controls the display unit 160 and can display the menu screen of setting the theme tag information, after step 301. Among the images stored in the mobile terminal, the theme tag information might not be set, while the user may attempt to additionally set the theme tag information. The time tag information and the location tag information are automatically set among the theme tag information, and the user can optionally set the user tag information in the theme tag set menu.

Figure 7:
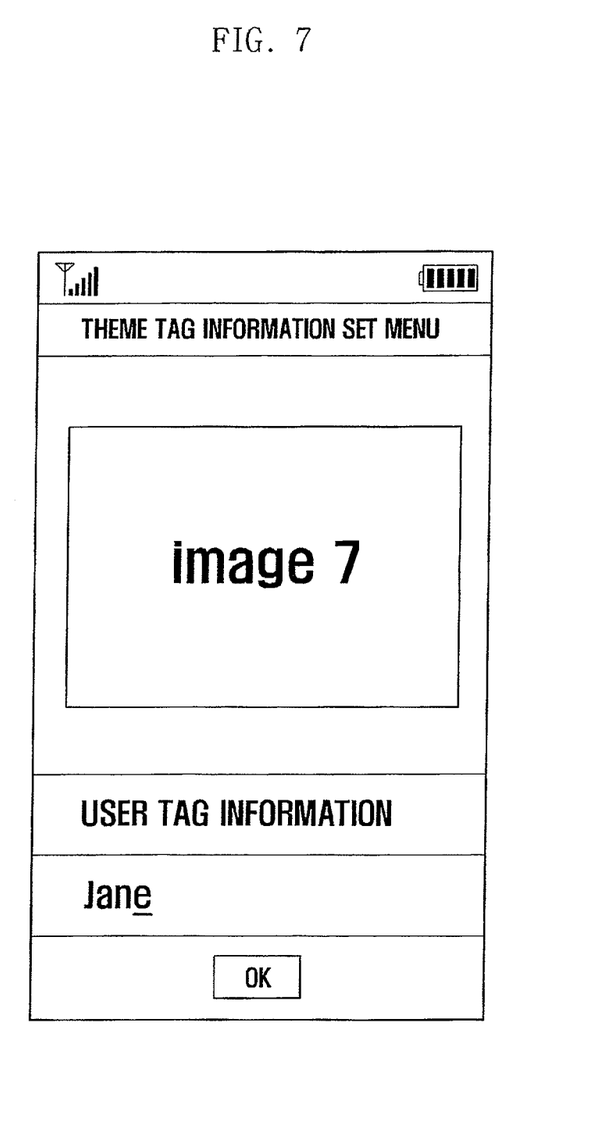
FIG. 7 is a diagram illustrating a menu screen for setting theme tag information according to an exemplary embodiment of the present invention.

FIG. 7 is a diagram illustrating a menu screen for setting theme tag information according to an exemplary embodiment of the present invention.

Referring to FIG. 7, 'Image 7', which is an image newly stored in the mobile terminal, is displayed on the upper portion of the display screen, while an input window for inputting the user tag information is displayed on the lower portion of the display screen. The user inputs information for setting in the new image and sets the user tag information. The user tag information which is set by the user is compared with the theme tag information which was used to configure the background screen at step 303. To this end, an application for setting the tag information of the image should be stored in the program area of the storage 140. According to the exemplary embodiment of FIG. 3, when a new image is generated and stored in the mobile terminal, the present set background screen can be automatically updated.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of setting a background screen of a mobile terminal, the method comprising:
   receiving a selection of a background screen set menu;
   generating a tag information list by using at least one tag information which classifies images stored in the mobile terminal by related image;
   displaying the generated tag information list;
   receiving a selection of at least one tag information from among the displayed tag information list;
   configuring a background screen with at least one image classified as the at least one selected tag information;
   receiving a command of storing a new image in the mobile terminal;
   extracting tag information included in the new image in which the store command is inputted;
   determining whether the extracted tag information coincides with tag information which is used to configure a present background screen; and
   including the new image in which the store command is inputted to re-configure the background screen when the extracted tag information coincides with the tag information which is used to configure the present background screen.

2. The method of claim 1, wherein the tag information comprises at least one among a user tag information generated by an input of a user, a time tag information of an image generation time, and a location tag information of an image generation location.

3. The method of claim 1, further comprising:
- extracting tag information which is respectively included in the plurality of images stored in the mobile terminal; and
- classifying the plurality of images by the extracted tag information.

4. The method of claim 1, wherein the generating of the tag information list comprises:
- extracting the tag information which is respectively included in the plurality of images stored in the mobile terminal;
- classifying the plurality of images by the extracted tag information; and
- generating a tag information list by using the extracted tag information.

5. The method of claim 2, wherein the generating of the tag information list comprises:
- classifying the at least one tag information into one or more of the user tag information, the time tag information, and the location tag information; and
- generating a tag information list accordingly.

6. The method of claim 1, wherein the configuring of the background screen comprises configuring the background screen with images which each include any one among the selected tag information, when a selection of a plurality of tag information is inputted.

7. The method of claim 1, wherein the configuring of the background screen comprises configuring the background screen with images which each include all of the selected tag information, when a selection of a plurality of tag information is inputted.

8. The method of claim 1, wherein the configuring of the background screen comprises:
- displaying at least one image classified as a selected at least one tag information;
- setting a sequence of displaying the selected at least one image on the background screen; and
- configuring the background screen by applying the set display sequence.

9. The method of claim 1, wherein the configuring of the background screen comprises:
- setting a type of displaying the at least one image on the background screen; and
- configuring the background screen by applying the set display type.

10. The method of claim 9, wherein the display type of image comprises at least one of a dynamic type and a static type.

11. The method of claim 10, wherein the dynamic type comprises a slide show type and the static type comprises a mosaic type.

12. The method of claim 1, wherein prior to the extracting of the tag information, a user sets a user tag information of the new image.

13. The method of claim 1, further comprising automatically setting a user tag information of the new image.

14. The method of claim 13, wherein the user tag information is automatically set through a recognition of contents of the new image.

15. The method of claim 14, wherein the recognized contents comprise a face.

16. The method of claim 15, further comprising:
- recognizing a face in the new image;
- determining whether an image comprising the face is stored in an image database;
- checking a user tag information of the stored image comprising the face; and
- setting the user tag information of the new image to be the same as the user tag information of the stored image comprising the face.

17. A mobile terminal, comprising:
- a storage unit for storing a plurality of images and at least one tag information which classifies the plurality of images by related image;
- a display unit for displaying a tag information list configured of the at least one tag information;
- an input unit for receiving a command of a user; and
- a controller for controlling the input unit to receive a selection of a background screen set menu, for generating a tag information list by using the tag information stored in the storage, for controlling the display unit to display the generated tag information list, for controlling the input unit to receive a selection of at least one tag information among the displayed tag information list, and for configuring a background screen with at least one image classified as the at least one selected tag information,
- wherein the controller controls the input unit to receive a command of storing an image in the storage unit, extracts tag information included in the image in which the store command is inputted, determines whether the extracted tag information coincides with tag information which is used to configure the present background screen, and includes the image in which the store command is inputted to re-configure the background screen if the extracted tag information coincides with the tag information which is used to configure the present background screen.

18. The mobile terminal of claim 17,
- wherein the storage unit comprises an image database comprising the plurality of images and a theme tag information database comprising the at least one tag information, and
- wherein each of the at least one tag information corresponds to at least one of the plurality of images.

* * * * *